United States Patent Office 2,779,498
Patented Jan. 29, 1957

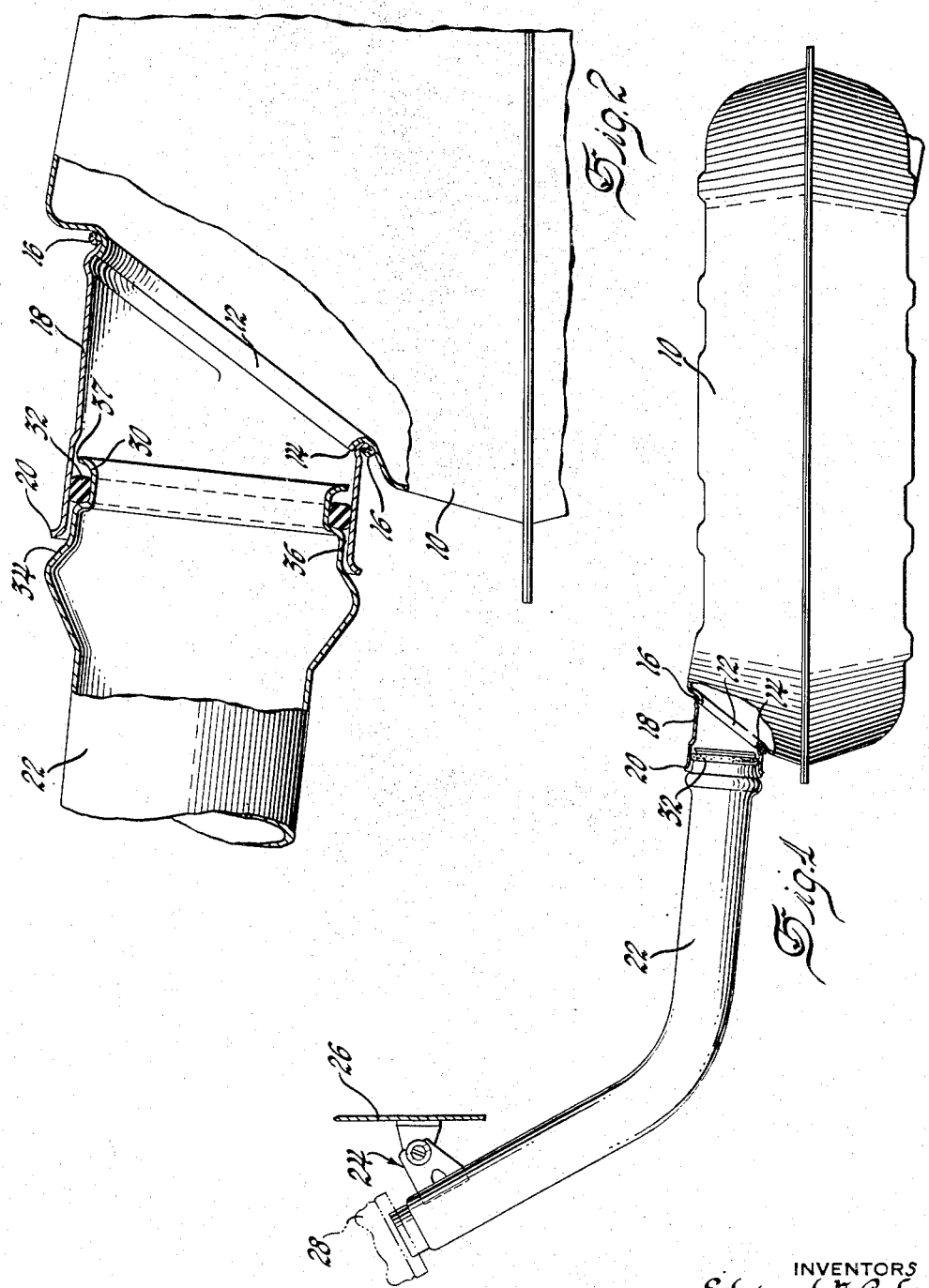

2,779,498
FUEL TANK AND FITTING

Edward N. Cole, Detroit, and Edward J. Naudzius, Birmingham, Mich., assignors to General Motors Corporation, Detroit, Mich., a corporation of Delaware Application September 3, 1954, Serial No. 454,110

1 Claim. (Cl. 220—86)

This invention relates to tanks and more particularly to fuel or gasoline tanks employed in vehicles and to which tube members are attached as fittings to facilitate filling of the tanks.

When fuel tanks are made with filler tubes integral therewith, the devices constitute cumbersome pieces which are difficult to ship and to store. The tubes are generally of considerable length which factor must be considered in providing sufficient space for the shipment or storage. Handling of the devices is not only difficult because of the tubular protuberances but it must be with care as any undue strain in the junctions between the tubes and the corresponding tanks may cause damage and leakages. In place of making the filler tube and tank as an integral unit, it has sometimes been the practice to make those parts separately and ultimately to connect them in a vehicle by means of a flexible conduit and suitable clamps. This latter expedient is not entirely satisfactory as leakages may occur at either or both of the two joints necessarily formed and the installation in a given vehicle cannot be carried out as expeditiously or as quickly as would be desired.

An object of the invention is the provision of a fuel tank in combination with a tubular filling spout member which is attachable or detachable from the tank in a construction which provides an improved seal joint.

Another object of the invention is the provision of a fuel tank with a tubular filling spout member having a sealed universal connection leading to the tank.

A feature of the invention resides in a fuel tank having an inlet tube member affixed thereto and a filler tube member telescopically arranged with respect to the inlet tube member and sealed thereto by means of an annular ring of resilient and tough plastic material resistant to the chemical action of the fluid to be placed in the tank.

Another feature comprises tubular members cooperatively serving as feed inlet means for a fuel tank and these members being universally movable with respect to each other and provided with stop means for limiting their relative axial movement.

These and other important features of the invention will now be described in detail in the specification and then pointed out more particularly in the appended claim.

In the drawings:

Fig. 1 is an elevational view with portions in section and showing an automobile gasoline tank and an inlet tube member associated therewith, the construction embodying one form of the present invention; and Fig. 2 is an enlarged view partially in section of a portion of the construction shown in Fig. 1.

In the illustrated apparatus a conventional fuel tank 10 is shown adapted to be mounted in a horizontal position at the rear end of an automobile. In the present instance, however, the upper portion of the tank is provided with an opening 12 defined by a marginal portion 14 which is welded at 16 to an inlet tubular member 18. Tubular member 18 is outwardly flared at its outer end 20 and telescopically receives one end of a tubular filling spout member 22. The other end of the member 22 is provided with a supporting bracket arrangement generally indicated at 24 by means of which the member may be held to a portion 26 of the vehicle body. The filler tube member 22 is curved and extends in an upward direction so that one end is convenient and accessible for the introduction of fuel, and has secured thereto a removable cap 28.

The end of the tube member 22 that extends within the member 18 is formed with an annular groove 30 for the reception and retention of a sealing ring 32. The member 22 is also provided with an annular ridge or shoulder 34 which constitutes a stop means limiting inward and axial movement thereof with respect to the spout member 18. It will be noted that an annular space 36 is provided between the two members 18 and 22 because of the relative proportions of the latter. A space 37 is also provided between the extreme end of the tube 22 and the member 18.

The sealing ring 32 is made of a plastic material of extreme toughness but which is also fairly soft, flexible, non-porous and unaffected by the fuel as for example, a polymerized tetrafluoro-ethylene known commercially as "Teflon." Other plastics such as polyethylene or vinyl chlorides, fluorides, or mixtures of them may also be used. Neoprene or any rubber of suitable toughness and softness and which is not adversely affected by the fuel or liquid to be handled will be satisfactory.

It will be seen from the above that tanks 10 with the short inlet tube members 18 permanently affixed thereto should present no problems in shipping, storing or installing as they constitute compact units which are easily handled and have no awkward protuberances. It will also be understood that when a given tank 10 has been installed in a vehicle, it is an easy and quickly performed operation to insert a tubular filling spout member 22 with a ring 32 in place thereon so that the members 18 and 22 are brought into telescopic and sealed relation. Alignment of the parts is not critical as the clearances 36 and 37 and the nature of the sealed joint employing the ring 32 permit great latitude in supporting the upper end of the member 22 by the bracket arrangement 24. The tube 22 cannot enter the tube member 18 for too great a distance because of the stop shoulder 34. Movement of the tube 22 in the other direction or away from the tank 10 is prevented by the connection of the bracket 24 with the body portion 26.

We claim:

A fuel tank for use on an automotive vehicle, said tank being provided with an inlet tubular member having an annular flared edge at one free end and another end joined integrally and permanently to an upper side portion of said tank, a curved filling spout member with one end portion arranged remote from said tank and being fitted with a bracket arrangement for support on said vehicle and the other end portion of said spout member being arranged in telescopic relation with said tubular member, said bracket arrangement being adapted to prevent longitudinal movement of said spout member, a groove formed in said other end portion of said spout member, an annular sealing ring of tough flexible plastic material retained in said groove and resiliently pressing outwardly against said tubular member, a stop shoulder formed on said spout member as an annular ridge facing the said flared edge, and a clearance being provided between said members to permit universal movement adequate to compensate for variations in the relative positions of said tank and bracket arrangement.

References Cited in the file of this patent

UNITED STATES PATENTS

| | | |
|---|---|---|
| 2,104,461 | Holm | Jan. 4, 1938 |
| 2,466,076 | Bentley | Apr. 5, 1949 |
| 2,516,743 | Allin | July 25, 1950 |
| 2,684,779 | Rafferty | July 27, 1954 |

FOREIGN PATENTS

| | | |
|---|---|---|
| 2,734 | Great Britain | of 1873 |
| 507,026 | Great Britain | June 8, 1939 |